United States Patent
Serizawa

(10) Patent No.: US 7,256,954 B2
(45) Date of Patent: Aug. 14, 2007

(54) ADAPTIVE EQUALIZER

(75) Inventor: Orimitsu Serizawa, Gyouda (JP)

(73) Assignee: Sanyo Electric Co., Ltd., Osaka (JP)

(*) Notice: Subject to any disclaimer, the term of this patent is extended or adjusted under 35 U.S.C. 154(b) by 165 days.

(21) Appl. No.: 10/978,237

(22) Filed: Oct. 29, 2004

(65) Prior Publication Data
US 2005/0117243 A1 Jun. 2, 2005

(30) Foreign Application Priority Data
Oct. 31, 2003 (JP) .............................. 2003-373606

(51) Int. Cl.
*G11B 5/35* (2006.01)
(52) U.S. Cl. ..................... 360/65; 360/46; 360/66; 360/67; 360/68
(58) Field of Classification Search .................... None
See application file for complete search history.

(56) References Cited

U.S. PATENT DOCUMENTS

| | | | | |
|---|---|---|---|---|
| 4,707,841 A | * | 11/1987 | Yen et al. | 375/230 |
| 5,214,671 A | * | 5/1993 | Nakai | 375/232 |
| 5,341,249 A | * | 8/1994 | Abbott et al. | 360/46 |
| 5,361,174 A | * | 11/1994 | Seki et al. | 360/46 |
| 5,369,667 A | * | 11/1994 | Hara | 375/230 |
| 5,450,253 A | * | 9/1995 | Seki et al. | 360/65 |
| 5,517,524 A | * | 5/1996 | Sato | 375/230 |
| 5,999,355 A | * | 12/1999 | Behrens et al. | 360/65 |
| 6,055,119 A | * | 4/2000 | Lee | 360/51 |
| 6,160,673 A | * | 12/2000 | Izumi et al. | 360/46 |
| 6,201,832 B1 | * | 3/2001 | Choi | 375/233 |
| 6,449,110 B1 | * | 9/2002 | DeGroat et al. | 360/46 |
| 6,501,610 B1 | * | 12/2002 | Sugawara et al. | 360/65 |
| 6,577,461 B2 | * | 6/2003 | Satoh et al. | 360/46 |
| 6,904,086 B2 | * | 6/2005 | Nishimura et al. | 375/232 |
| 6,975,252 B2 | * | 12/2005 | Yamakawa et al. | 341/50 |
| 7,012,772 B1 | * | 3/2006 | Vis | 360/46 |
| 2003/0138038 A1 | * | 7/2003 | Greiss et al. | 375/232 |
| 2003/0151842 A1 | * | 8/2003 | Takiguchi | 360/65 |
| 2004/0169945 A1 | * | 9/2004 | Hiura et al. | 360/39 |

FOREIGN PATENT DOCUMENTS

JP 5-40907 2/1993

OTHER PUBLICATIONS

English Patent Abstract of 5-40907 from esp@cenet.

* cited by examiner

*Primary Examiner*—Andrea Wellington
*Assistant Examiner*—Dismery Mercedes
(74) *Attorney, Agent, or Firm*—Osha Liang LLP

(57) ABSTRACT

An adaptive equalizer comprising a variable filter which equalizes a digital input signal which is input in a time sequential order, an adaptive controller unit which updates a filter coefficient of the variable filter based on an output signal of the variable filter and the input signal and according to an equalization algorithm, and a coefficient resetting unit which resets a filter coefficient of the variable filter at a predetermined timing.

9 Claims, 4 Drawing Sheets

ADAPTIVE EQUALIZER

CROSS-REFERENCE TO RELATED APPLICATIONS

The entire disclosure of Japanese Patent Application No. 2003-373606 including specification, claims, drawings and abstract is incorporated herein by reference.

BACKGROUND OF THE INVENTION

1. Field of the Invention

The present invention relates to an adaptive equalizer for waveform equalization of a replay signal of data recorded on a recording medium or the like, and in particular, to control of filter coefficients of a variable filter used for equalization.

2. Description of the Related Art

In a magnetic replay device for replaying magnetic data recorded on a magnetic recording medium, an adaptive equalizer is used for compensating amplitude distortion or phase distortion of the replay signal from a magnetic head (refer to, for example, Japanese Patent Laid-Open Publication No. Hie 5-40907).

In the adaptive equalizer, an equalization process is applied to an input signal by an FIR (Finite Impulse Response) filter. An output of the FIR filter is supplied to a decoding circuit and a data sequence is decoded through determination of "1" and "0" by level comparison or the like. A difference between an output from the decoding circuit and an output from the FIR filter is calculated and sent to an adaptive controller unit. The adaptive controller unit adaptively updates filter coefficients of the FIR filter so that a signal power of the difference is minimized.

In an adaptive equalization of determination feedback as described above, when a state continues in which an input signal is significantly different from the equalization target characteristic such as, for example, when there is damage to the magnetic tape, the filter coefficients diverge and cannot converge to the target equalization characteristic. As a result, video data and audio data cannot be properly reconstructed.

SUMMARY OF THE INVENTION

According to one aspect of the present invention, there is provided an adaptive equalizer which adaptively equalizes a digital input signal which is input in a time sequential order, the adaptive equalizer comprising a variable filter which equalizes the input signal, an adaptive controller unit which updates a filter coefficient of the variable filter based on an output signal of the variable filter and the input signal and according to an equalization algorithm, and a coefficient resetting unit which resets the filter coefficient of the variable filter at a predetermined timing.

BRIEF DESCRIPTION OF THE DRAWINGS

Preferred embodiments of the present invention will be described in detail based on the following drawings, wherein.

DESCRIPTION OF PREFERRED EMBODIMENT

Figure 1:
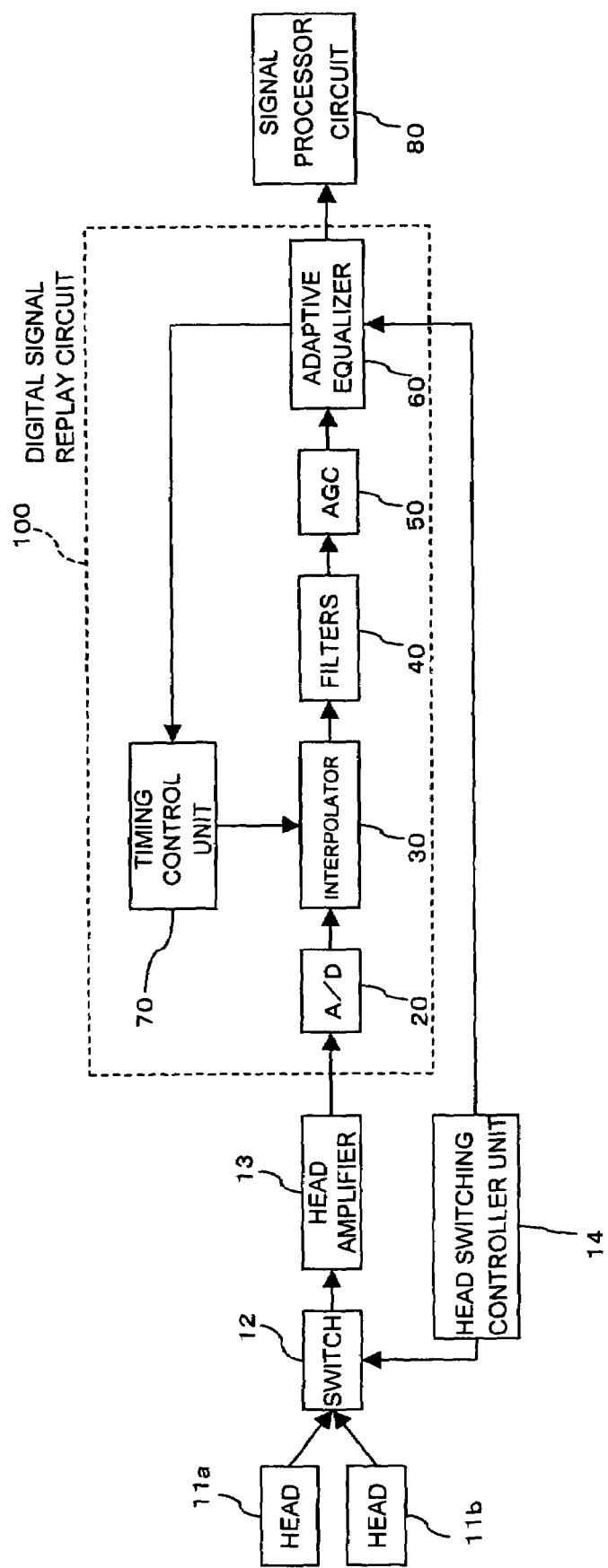
FIG. 1 is a block diagram showing a structure of a digital signal replay device.

A preferred embodiment (hereinafter referred to simply as "embodiment") of the present invention will now be described referring to the drawings.

FIG. 1 is a block diagram showing a digital signal replay device according to a preferred embodiment of the present invention. In this embodiment, the digital signal replay device is a magnetic replay device of a digital video camera. The digital video camera converts a video signal into a digital signal and records the digital signal on a magnetic tape and replays the digital signal from the magnetic tape using a method which is known as a partial response method. A partial response method is a method in which inter-code interference due to conduction characteristics of a conduction path (or recording medium) is actively used to shape a spectrum of the code, and includes, for example, partial response class IV.

In the structure shown in FIG. 1, a magnetic signal recorded on a magnetic tape (not shown) is converted into an electrical signal by two magnetic heads 11a and 11b. Replay signals from the two magnetic heads 11a and 11b are alternately supplied to a head amplifier 13 via a head switching switch 12. The head switching switch 12 operates based on a head switching signal supplied from a head switching controller unit 14. In this manner, the two magnetic heads 11a and 11b alternately replay tracks on the magnetic tape, one track at a time.

The head amplifier 13 amplifies a signal supplied from the head switching switch 12 and outputs the amplified signal to a digital signal replay circuit 100. The digital signal replay circuit 100 is an LEI (Large Scale Integrated circuit) which applies a bit clock synchronization process to the tape replay signal, which is a signal replayed from the tape, supplied from the head amplifier 13 and a waveform equalization process to a waveform of PR (partial response class IV). The analog signal from the head amplifier 13 is A/D (analog-to-digital) converted and the process at the digital signal replay circuit 100 is performed through digital signal processes.

In the digital signal replay circuit 100, an A/D converter 20 over samples an analog signal supplied from the head amplifier 13 at a predetermined interval. An interpolater 30 estimates and interpolates data values of data points (also referred to as bit points) of digital data recorded on the magnetic tape based on the digital signal a synchronously sampled by the A/D converter 20. In this process, the interpolater 30 is controlled by a timing controller unit 70 so that the positions of the interpolation match the bit positions. When the positions of the interpolation approximately matches the bit positions, a bit timing synchronization is established.

A waveform shaping process of a certain degree is applied to a signal obtained through the interpolation by the interpolater 30 by a group of filters 40 for preprocessing and an AGC (Automatic Gain Control) circuit 50 and a waveform equalization process is applied by an adaptive equalizer 60. The equalized signal obtained through the adaptive equalizer 60 is fed back to the interpolater 30 through the timing control unit 70 and is also sent to a signal processor circuit 80 which is external to the LEI. The signal processor circuit 80 applies processes such as determination of the digital signal value and error correction, and video data and audio data are ultimately reconstructed in the signal processor circuit 80.

Figure 2:
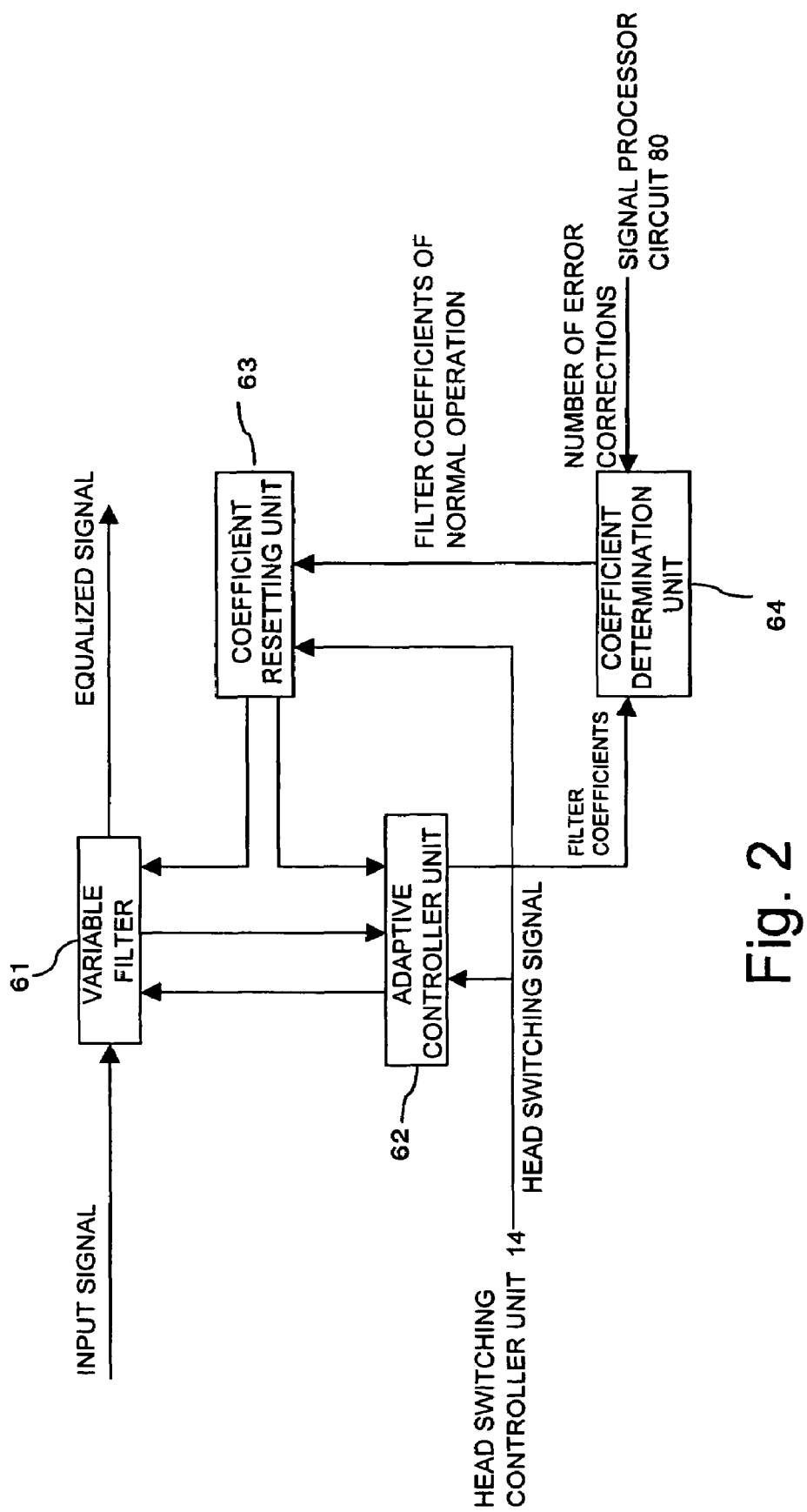
FIG. 2 is a block diagram showing a structure of an adaptive equalizer.

FIG. 2 is a block diagram showing a structure of the adaptive equalizer 60 according to the embodiment. An output signal of the AGC circuit 50 (hereinafter referred to as "input signal x") is supplied to the adaptive equalizer 60. A variable filter 61 applies a waveform equalization process to the input signal x. Filter coefficients (also referred to as a "tap coefficients") of the variable filter 61 are adaptively updated by an adaptive controller unit 62.

The update of the filter coefficients is started after the bit timing synchronization is established, because if the update is performed before the establishment of synchronization, there is a possibility that the filter coefficients may diverge as the input signal x is significantly different from the equalization target characteristic and also because the update process interferes with the timing control operation and the interpolater 30 and the adaptive equalizer 60 do not operate properly.

In addition, in the embodiment, the filter coefficients are reset by a filter resetting unit 63 at a predetermined timing. With this configuration, it is possible to converge the filter coefficients after the resetting process even when the filter coefficients diverge due to a damage on the magnetic tape or the like.

In the embodiment, the resetting process of the filter coefficients is performed according to a switching timing of the magnetic heads 11a and 11b in order to avoid a reset during sequential replay of data of one track. The filter coefficients which are set by the reset are coefficients of normal operation in order to shorten the convergence time. The filter coefficients of normal operation are filter coefficients corresponding to a state of certain convergence and may be obtained through any method. Specifically, the coefficient resetting unit 63 detects a switching timing between heads based on a head switching signal supplied from the head switching controller unit 14. Then, when the switching between the heads is detected, the coefficient resetting unit 63 resets the filter coefficients of the variable filter 61 to the filter coefficients of normal operation. Here, the filter coefficients of normal operation are determined and stored in a coefficient determination unit 64, which will be described later in more detail.

The timing of the reset is not limited to that described above. For example, it is possible to reset in synchronization with a frame pulse output in each frame of an image or to reset every time a predetermined time has elapsed as measured by a timer (not shown). Moreover, the filter coefficients set by the reset process are not limited to that described above and may alternatively be another values such as, for example, preset filter coefficients. Examples of the preset filter coefficients include, for example, coefficients with a flat characteristic having no frequency characteristic.

Figure 3:
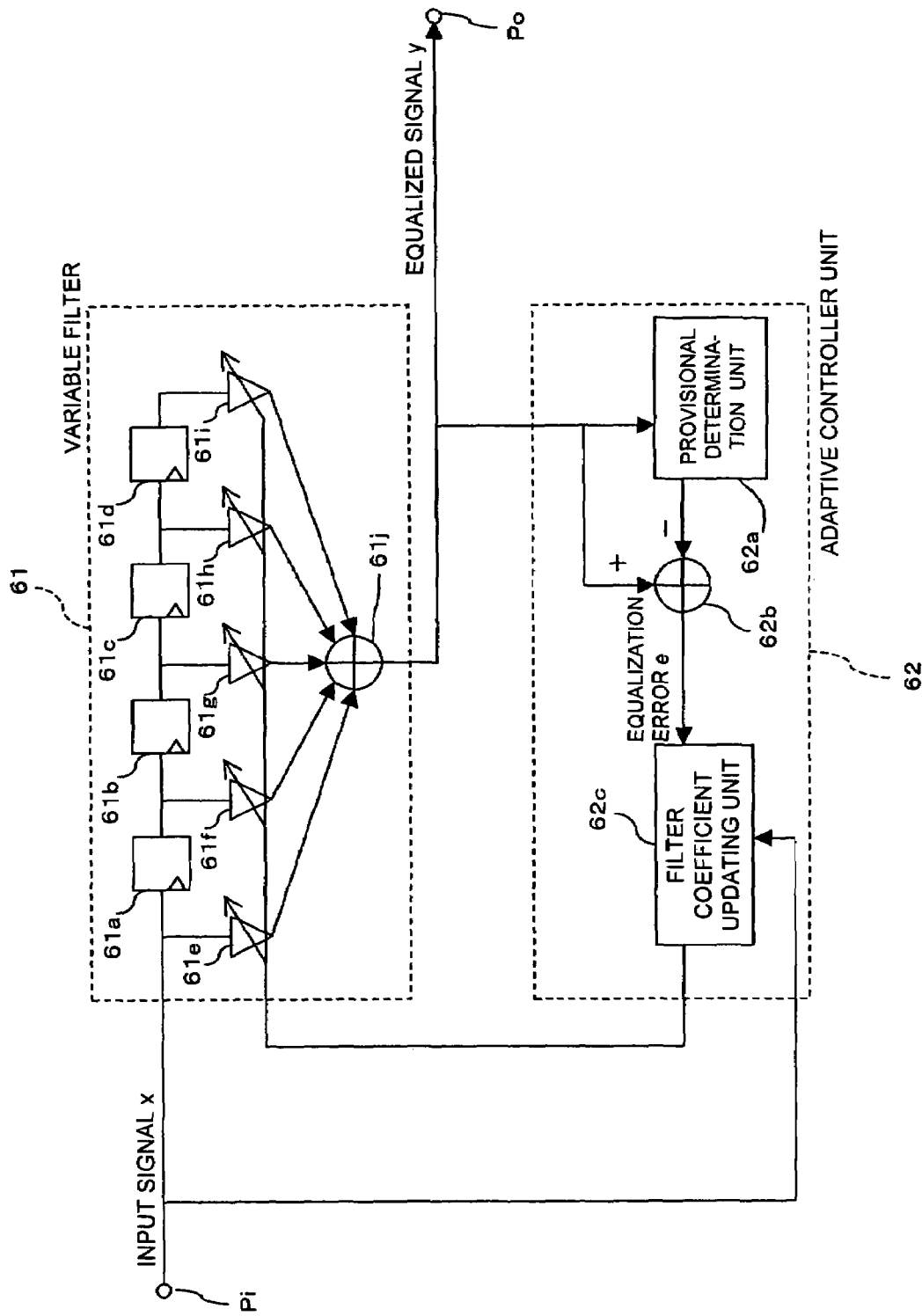
FIG. 3 is a block diagram showing a structure of a variable filter and an adaptive controller unit.

FIG. 3 is a block diagram showing a structure of the variable filter 61 and the adaptive controller unit 62. The variable filter 61 and the adaptive controller unit 62 will now be described in more detail referring to FIG. 3.

The variable filter 61 is a filter which applies a waveform equalization process to the input signal x. In the embodiment, the variable filter 61 is a 5-tap FIR (Finite Impulse Response) filter, as shown in FIG. 3. The input signal x input from an input terminal Pi is sent to a serial circuit having a number of delay elements, the number being dependent on the tap number, and, in the exemplified configuration, the serial circuit has four delay elements 61a, 61b, 61c, and 61d. An input signal $x_0$ from the input terminal Pi and outputs $x_{-1}$, $x_{-2}$, $x_{-3}$, and $x_{-4}$ from the delay elements 61a, 61b, 61c, and 61d are respectively sent to coefficient multipliers 61e, 61f, 61g, 61h, and 61i in which the signals $x_0$, $x_{-1}$, $x_{-2}$, $x_{-3}$, and $x_{-4}$ are respectively multiplied by filter coefficients $w_0$, $w_1$, $w_2$, $w_3$, and $w_4$. The results of the multiplication are added in an adder 61j. The calculated value is output as an equalized signal y to the timing controller unit 70 and signal processor circuit 80 through an output terminal Po. That is, $y=w_0 \cdot x_0+w_1 \cdot x_{-1}+w_2 \cdot x_{-2}+w_3 \cdot x_{-3}+w_4 \cdot x_{-4}$. The filter coefficients $w_0$, $w_1$, $w_2$, $w_3$, and $w_4$ are configured to be updated by the adaptive controller unit 62.

The adaptive controller unit 62 adaptively updates the filter coefficients of the variable filter 61 based on the input signal x and the equalized signal y output from the variable filter 61, and according to an adaptive algorithm. In the embodiment, the adaptive controller unit 62 comprises a provisional determination unit 62a, an adder 62b, and a filter coefficient updating unit 62c. The provisional determination unit 62a performs level comparison between the equalized signal y and a predetermined threshold value and determines a digital signal value of "−1", "0", or "1". The adder 62b subtracts a determination result of the provisional determination unit 62a from the equalized signal y and calculates an equalization error e. For example, when the equalized signal y is "0.8" and a digital signal value of "1" is determined, the equalization error e becomes "−0.2". The filter coefficient updating unit 62c calculates filter coefficients to be updated based on the input signal x and the equalization error e calculated by the adder 62b and according to the adaptive algorithm. The filter coefficient updating unit 62c replaces the filter coefficients of the variable filter with the calculated filter coefficients. Here, examples of the adaptive algorithm include an LMS (Least Mean Square) method, an RLS (Recursive Least Square) method, and a method of steepest descent, but it is possible to employ any method which allows update of filter coefficients so that the signal power of the equalization error e is minimized.

Figure 4:
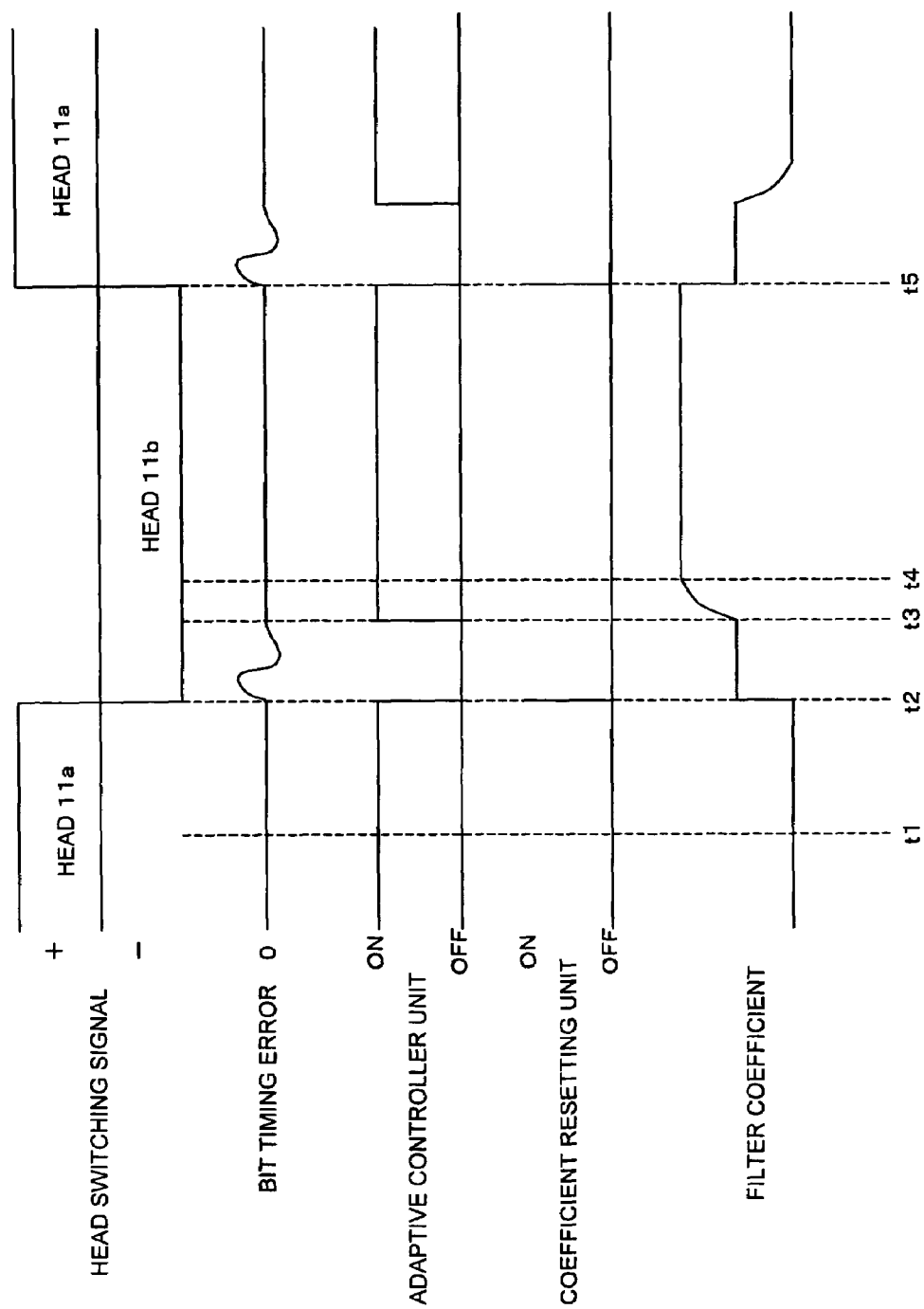
FIG. 4 is a timing chart for explaining an operation of the adaptive equalizer.

An operation of the adaptive equalizer 60 will now be described referring to a timing chart of FIG. 4. In the configuration shown in FIG. 4, at time t1, the head switching signal is positive and the magnetic head 11a is being used. The bit timing synchronization is established and an update process for the filter coefficients by the adaptive controller unit 62 is performed.

At time t2, the head switching signal is switched from positive to negative and the magnetic head to be used is switched from the magnetic head 11a to the magnetic head 11b. In this process, the bit timing synchronization is lost and a bit timing error is generated. If the updating process of the filter coefficients by the adaptive controller unit 62 is continued in this state, the updating process interferes with the timing control operation and neither the bit timing synchronization nor the adaptive equalization can be properly performed. In consideration of this, the adaptive controller unit 62 monitors the head switching signal of the head switching controller unit 14 and stops the update process of the filter coefficients at a rise or a fall of the head switching signal. The coefficient resetting unit 63 also monitors the head switching signal of the head switching controller unit 14 and resets the filter coefficients of the variable filter 61 to the coefficients of normal operation at a rise or a fall of the head switching signal. In this process, the filter coefficients of normal operation are read from the coefficient determination unit 64. Because the filter coefficients are also used in calculation at the filter coefficient updating unit 62c, the coefficient resetting unit 63 also supplies the filter coefficients which are set by the resetting process to the adaptive controller unit 62. There set process by the coefficient resetting unit 63 may alternatively be executed after a predetermined time is elapsed from the rise or fall of the head switching signal.

The time from when the magnetic head is switched between the magnetic heads 11a and 11b to the establishment of the bit timing synchronization is approximately constant. Therefore, in the embodiment, it is assumed that the bit timing synchronization is established at time t3 which is a preset time Δt later than time t2 and the update process of the filter coefficients is started. More specifically, the adaptive controller unit 62 measures the elapsed time from time t2 using a timer (not shown) and starts the update process of the filter coefficients when the elapsed time reaches Δt. Then, the filter coefficients approximately converge at time t4 shown in FIG. 4. It is only necessary for the update process of the filter coefficients by the adaptive controller unit 62 to be started after the bit timing synchronization is established, and therefore, the update process of the filter coefficients may be started when, for example, a bit timing error becomes a predetermined value or smaller.

Here, it is preferable that a signal passing through the variable filter 61 is a preamble signal in the period between time t2 and t3 and is a user data signal after time t3. It is more preferable that the signal passing through the variable filter 61 is a preamble signal in a period between time t2 and time t4 and is a user data signal after time t4.

A method of determining filter coefficients of normal operation will now be described. It can be considered that a smaller number of error correction (can also be number of error detection) in the signal processor circuit 80 with respect to the equalized signal indicates a more satisfactory realization of the waveform equalization. Therefore, the filter coefficients which minimize the number of error correction are set as the filter coefficients of normal operation. The coefficient determination unit 64 determines the filter coefficients of normal operation based on the number of error correction of equalized signal and the filter coefficients when the equalized signal is obtained. Specifically, the coefficient determination unit 64 monitors the filter coefficients of the variable filter 61 and the number of error correction of equalized signal at the signal processor circuit 80. The coefficient determination unit 64 stores, as the filter coefficients of normal operation, filter coefficients corresponding to the time when an equalized signal is obtained with a minimum number of error correction. Therefore, the filter coefficients of normal operation are updated every time a minimum number of error correction is observed.

The filter coefficients of normal operation may be determined by any other method as long as filter coefficients at a state of a certain convergence can be obtained. For example, it is possible to set the filter coefficients of normal operation to average values of the filter coefficients immediately before the reset (in FIG. 4, the filter coefficients immediately before time t2 and the filter coefficients immediately before time t5).

As described, according to the present embodiment, because the filter coefficients of the variable filter 61 which are adaptively updated in the adaptive equalizer 60 are reset at a predetermined timing, the filter coefficients can be converged after the reset even when the filter coefficients diverge. With this configuration, it is possible to avoid a situation in which a state of divergence of the filter coefficients continues for a long period of time. Because convergence can be achieved in a short period in the adaptive equalization, practically, a frequent resetting process does not cause a problem.

According to another aspect of the present invention, it is preferable that, in the adaptive equalizer, the input signal x is a signal in which digital data recorded on a magnetic recording medium is replayed by a plurality of magnetic heads which are used through switching and the coefficient resetting unit 63 resets based on a timing of switching between the magnetic heads. Because of this configuration, reset is not performed during sequential replay of data for one track. Therefore, it is possible to sequentially process sequential data.

In addition, because the filter coefficients are reset to filter coefficients of normal operation, it is possible to achieve convergence in a short period from the time of reset.

According to another aspect of the present invention, it is preferable that, in the adaptive equalizer, the input signal x is a replay signal in which digital data recorded on a recording medium is relayed and the adaptive controller unit 62 starts update of the filter coefficients after a bit timing synchronization is established. With this structure, it is possible to prevent divergence of the filter coefficients due to the update process of the filter coefficients before the establishment of the bit timing synchronization. In addition, it is also possible to avoid interference between the bit timing control and the adaptive equalization.

The present invention is not limited to the embodiment described above and may be changed in various ways within the scope and spirit of the present invention. For example, the digital signal replay device is not limited to a magnetic replay device and may be any device which replays digital data such as, for example, an optical disk replay device for CD, DVD, or the like and a digital receiver device.

The specific structures of the variable filter and the adaptive controller unit are not limited to those described above. For example, it is possible to use, in the adaptive controller unit, an error correction result obtained by the signal processor circuit 80 in place of the determination result by the provisional determination unit 62a.

The constituting parts of the digital signal replaying device are not limited to dedicated hardware circuits and may alternatively be realized by a CPU and RAM executing a program stored in a storage medium such as a ROM.

What is claimed is:

1. An adaptive equalizer that adaptively equalizes a digital input signal input in a time sequential order, the adaptive equalizer comprising:
    a variable filter that equalizes the input signal;
    an adaptive controller unit that updates a filter coefficient of the variable filter based on an output signal of the variable filter and the input signal and according to an equalization algorithm;
    a coefficient determination unit that determines a filter coefficient of normal operation based on the filter coefficient updated by the adaptive controller unit; and
    a coefficient resetting unit that resets the filter coefficient of the variable filter to the filter coefficient of normal operation determined by the coefficient determination unit at a predetermined timing.

2. The adaptive equalizer according to claim 1, wherein
    the input signal is a signal in which digital data recorded on a magnetic recording medium is replayed by a plurality of magnetic heads that are used through switching; and
    the coefficient resetting unit resets based on timing of switching between the magnetic heads.

3. The adaptive equalizer according to claim 1, wherein the coefficient determination unit determines the filter coefficient of normal operation based on a number of error corrections of an equalized signal output from the variable filter and the filter coefficient when the equalized signal is obtained.

4. The adaptive equalizer according to claim 3, wherein the coefficient determination unit determines a filter coefficient as the filter coefficient of normal operation when an equalized signal is obtained with a minimum number of error corrections.

5. The adaptive equalizer according to claim 1,
wherein the input signal is a replay signal in which digital data recorded on a recording medium is replayed; and
the adaptive controller unit starts update of the filter coefficient after a bit timing synchronization of the replay signal is established.

6. A digital signal replay device that replays digital data recorded on a recording medium, the digital signal replay device comprising:
an adaptive equalizer that equalizes a replay signal of the digital data,
wherein the adaptive equalizer comprises:
a variable filter that equalizes the replay signal, which is digital and is input in a time sequential order;
an adaptive controller unit that updates a filter coefficient of the variable filter based on an output signal of the variable filter and the replay signal and according to an equalization algorithm;
a coefficient determination unit that determines a filter coefficient of normal operation based on the filter coefficient updated by the adaptive controller unit; and
a coefficient resetting unit that resets the filter coefficient of the variable filter to the filter coefficient of normal operation determined by the coefficient determination unit at a predetermined timing.

7. A digital signal replay device that replays digital data recorded on a recording medium, the digital signal replay device comprising:
an A/D converter that samples a replay signal of the digital data;
an interpolator that estimates and interpolates a data value for a data point of the digital data based on a signal obtained from the A/D converter; and
an adaptive equalizer that applies an equalization process on a signal obtained from the interpolator as an input signal and which feedbacks the equalized signal to the interpolator for the estimation and interpolation;
wherein the adaptive equalizer comprises:
a variable filter that equalizes the input signal which is digital and which is input in a time sequential order;
an adaptive controller unit that updates a filter coefficient of the variable filter based on an output signal of the variable filter and the input signal and according to an equalization algorithm;
a coefficient determination unit that determines a filter coefficient of normal operation based on the filter coefficient updated by the adaptive controller unit; and
a coefficient resetting unit that resets the filter coefficient of the variable filter to the filter coefficient of normal operation determined by the coefficient determination unit at a predetermined timing;
wherein the adaptive controller unit starts update of the filter coefficient after a position of estimation and interpolation by the interpolator approximately matches a data point of the digital data.

8. A computer readable medium containing instructions that allow a computer, in order to adaptively equalize a digital input signal input in a time sequential order, to function as:
a variable filter that equalizes the input signal;
an adaptive controller unit that updates a filter coefficient of the variable filter based on an output signal of the variable filter and the input signal and according to an equalization algorithm;
a coefficient determination unit that determines a filter coefficient of normal operation based on the filter coefficient updated by the adaptive controller unit; and
a coefficient resetting unit that resets a filter coefficient of the variable filter to the filter coefficient of normal operation determined by the coefficient determination unit at a predetermined timing.

9. An adaptive equalization method for adaptively equalizing a digital input signal input in a time sequential order, the method comprising:
an equalization step of equalizing the input signal by a variable filter;
an adaptive control step of updating a filter coefficient of the variable filter based on a signal obtained in the equalization step and the input signal and according to an equalization algorithm;
a coefficient determination step of determining a filter coefficient of normal operation based on the filter coefficient updated in the adaptive control step; and
a coefficient reset step of resetting a filter coefficient of the variable filter to the filter coefficient of normal operation determined in the coefficient determination step at a predetermined timing.

* * * * *